Nov. 5, 1940.  R. DUNCAN  2,220,222
SIREN
Filed Sept. 29, 1937
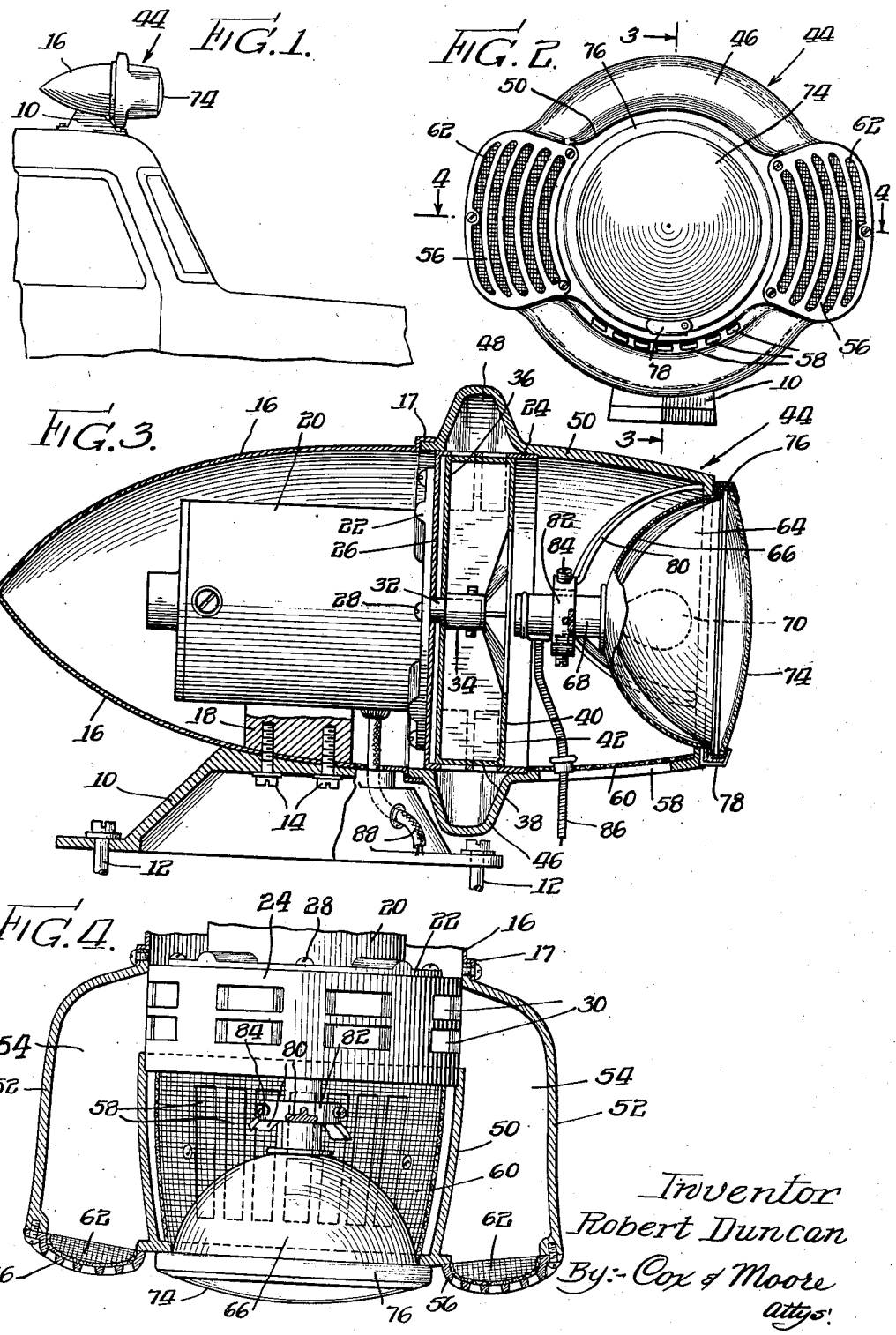
Inventor
Robert Duncan
By:- Cox & Moore
attys.

Patented Nov. 5, 1940

2,220,222

UNITED STATES PATENT OFFICE 2,220,222

SIREN

Robert Duncan, Chicago, Ill., assignor to Federal Electric Company, Inc., Chicago, Ill., a corporation of New York Application September 29, 1937, Serial No. 166,452

4 Claims. (Cl. 177—7)

The present invention relates to a combined sonic-visual signalling device for use on vehicles in order to warn pedestrians or other vehicles.

It is an object of the present invention to provide a new signalling and warning apparatus of improved and simplified construction adapted for use on vehicles requiring the right-of-way on the highway, such as ambulances, fire engines and police vehicles, which device is particularly adaptable for mounting exteriorly thereof in a position exposed to weather conditions.

The present invention relates more particularly to a siren type of signalling device of the sort shown in United States Letters Patent No. 2,172,413, issued September 12, 1939, on the invention of William W. Scott, wherein the sound effect is derived from a siren having a central rotor or impeller arranged to drive columns of air radially outwardly through apertures or ports which are rapidly opened and closed. This type of sound-making device is conventionally arranged so that the sound-producing ports or apertures are arranged annularly about the axis of the rotor, as a result of which the characteristic sound effect produced by the siren issues outwardly in all directions therefrom.

Vehicle signals, on the other hand, are desirably arranged to direct the sound forwardly of the vehicle. Moreover, siren ports situated on the exterior of the device, and more particularly on the upper portions thereof, are especially subject to the accumulation of foreign matter, such as sleet and moisture. Thus, under adverse winter conditions, the rotor may become frozen in the region of the ports or apertures when the unprotected device is mounted in a position accessible to the weather.

It is accordingly a purpose of the present invention to provide a novel combined siren and visual warning signal in which the siren is completely protected against weather conditions and in which the sound produced thereby may be directed forwardly of the vehicle.

An additional object of the present invention is to provide a signal warning device of the above type wherein the sonic effect and the visual effect are focused in the same or parallel directions so that when mounted upon a vehicle the warning alarms may be directed toward the path of movement thereof.

Other objects of the present invention are to provide a combined uni-directional flasher lamp and siren having an improved mounting for positioning and supporting a siren sound chamber and for mounting a flasher lamp centrally of the sound chamber; to provide a siren wherein the air inlet is positioned completely on the underside of the unit and protected against ingress of foreign matter; and to produce a simplified and compact arrangement of a light-producing apparatus and siren in a streamlined unit adaptable for application to the surface of a vehicle.

Numerous other objects and advantages will more fully appear during the course and progress of the following specification.

Figure 1 shows a warning device, constructed in accordance with the present invention, mounted in place upon an automobile.

Figure 2 is a front elevation of the signal warning device shown in Figure 1.

Figure 3 is a sectional elevation taken on the line 3—3 in Figure 2.

Figure 4 is a detail plan elevation taken on the line 4—4 in Figure 2.

The device, disclosed herein for the purpose of illustrating the present invention, is shown in Figure 1 as applied to the forward portion of the roof of an automobile and has a bracket 10 which is secured to the vehicle roof through the agency of a pair of bolts 12. A pair of machine screws 14 in turn passes through the upper portion of the bracket 10, as shown in Figure 3, and through apertures in the rear streamlined casing or shell 16, and are threaded in the block 18 which in turn is rigidly integral with the casing of the electric motor 20. It will be apparent, therefore, that the weight of the motor and the apparatus secured thereto is directly supported by the block 18 and the bracket 10.

The motor 20 is secured to a siren through the agency of a flange 22 integral with the motor casing, shown clearly in Figure 3. The siren proper comprises an outer, annular sheet wall 24 closed at its lefthand end, as viewed in Figure 3, by the wall 26 which is in turn fastened securely to the flange 22 by means of the machine screws 28.

As shown in Figure 4, the annular wall member 24 is provided with a plurality of sound ports or apertures 30 from which the characteristic sound of the siren emanates. The shaft 32 of the electric motor extends through a suitable aperture in the wall 26 and is rigidly secured to the central bushing 34 of the impeller or rotor by suitable set screws. The impeller or rotor in turn comprises a circular wall 36, arranged transversely of the shaft 32, which terminates in the annular wall 38 having an inwardly extending flange portion 40.

The impeller is provided with a plurality of radially extending vanes 42 which, when the impeller is rotated rapidly by the motor 20, direct columns of air radially outwardly by centrifugal force. Spaced apertures in the wall 38, periodically coinciding with the apertures 30 in the annular wall 24, produce the characteristic siren effect. A unitary casing 44 extends about the siren and, as will be readily apparent in Figure 3, is enlarged in the vicinity of the ports 30, as shown at 46, to provide the annular sound chamber 48.

The streamlined shell 16 enclosing the motor is provided at its forward end with an annular L-shaped flange 17 which engages over the rearward edge of the casing 44 and is releasably secured thereto by machine screws, as shown in Fig. 4. Forwardly thereof the wall of the casing engages with the forward end of the annular wall 24 of the siren and extends outwardly as at 50 to form a barrel-like body portion which supports the lamp to be hereinafter described in detail.

In order that the sound produced within the annular sound chamber 48 may be liberated in a predetermined direction from the device, there are provided integrally on either side of the casing curved walls 52 which provide a pair of ducts or conduits 54. These ducts communicate directly with the annular space 48 and are flared toward their forward end, as may be seen in Figure 4, where they are covered by a grating 56 to exclude debris and foreign matter.

The intake air necessary for the operation of the siren is drawn into the device through the longitudinally extending apertures 58. It will be noted that these inlet apertures, being formed on the underside of the casing, will not accumulate moisture and sleet since they are protected from above, not only by the superposed portions of the casing, but by the horizontally outwardly extending walls 52 of the side ducts. Fine mesh screens 60 and 62 further protect the inlet and outlet apertures of the siren against particles of debris.

The flashing device is mounted in an aperture in the front face of the casing and comprises a concave or parabolic reflector 64 supported within the concave housing 66 to which is rigidly secured the lamp socket 68 supporting the lamp 70. The housing 66 is provided with an outwardly extending, L-shaped, annular flange formed about the periphery of the parabolic reflector 64 as well as the peripheral edge of the lens 74, this assembly being maintained in position by means of the annular rim member 76 of U-shaped section and having a releasable locking connection 78 at the bottom portion thereof.

The rim 76 is in turn maintained against the front wall of the housing member 44 by means of a concave spider or yoke member having three curved legs 80 rigidly secured to a collar 82 and connected to the projecting portion of the lamp socket 68 by means of the set screws 84. Attention is directed to the fact that this portion of the unit may be disassembled by releasing the set screws 84 whereupon the concave spider, including the legs 80 and the collar 82, may be slidably removed from the socket 68. Conversely, when assembling the device, the housing 66 together with the reflector, lamp, socket, lens and assembled parts, are placed in the aperture in the front wall, as shown in Figure 3, after which the concave spider is placed over the socket portion 68 with the ends of the legs 80 adjacent the inner front wall of the casing 44. Tightening of the set screws 84 tends to maintain the assembly rigidly in the position shown.

Wire conduits 86 and 88 extend from the lamp socket and the motor, respectively, to a suitable source of electric current (not shown) for controlling the operation of the device.

While the present invention comprehends the employment of various types of visible signalling devices, nevertheless, according to the preferred embodiment, the lamp 70 is intended to be connected with a suitable device for producing repeated flashing thereof in order to attract immediate attention thereto. Moreover, in this embodiment it is preferred that the motor and flashing device be connected for coincidental operation.

In use, actuation of a suitable control switch by the driver of the vehicle permits electric current to drive the motor 20 and accordingly the siren, liberating the sound or noise thereof in the annular space 48, whence it is directed forwardly through the parallel side ducts 54. At the same time the lamp 70 is illuminated.

The present invention accordingly provides a compact and efficient device wherein, not only the light rays, but the sound waves are focused in a single direction. Accordingly the device may be mounted on a vehicle so that the visual and sonic warning effects are emanated directly toward the persons to be warned; that is, in most cases, forwardly of the vehicle. Moreover, the operating parts of the siren are completely enclosed and protected against exterior weather conditions.

The present invention will be readily adaptable to various other types of sound-producing, visual warning devices other than those herein disclosed for purposes of illustration.

It is thought that the invention and numerous of its attendant advantages will be understood from the foregoing description and it is obvious that numerous changes may be made in the form, construction and arrangement of the several parts without departing from the spirit or scope of the invention, or sacrificing any of its attendant advantages, the form herein described being a preferred embodiment for the purpose of illustrating the invention.

The invention is hereby claimed as follows:

1. In signalling means, a siren comprising a cylindrical stator formed circumferentially with spaced ports, a housing element providing a guard having portions embracing the stator and forming a chamber extending forwardly of said stator, means to support a light source on said housing element in position to transmit light rays in a direction forwardly of said chamber, said element forming also a plurality of sound outlet channels communicating with said ports and positioned to direct the sound produced by the siren forwardly in the direction of the light rays.

2. In signalling means, a siren comprising a cylindrical stator formed circumferentially with spaced ports, a housing element providing a guard having portions embracing the stator and forming a chamber extending forwardly of said stator and communicating with and forming an air intake for said siren, means to support a light source on said housing element in position to transmit light rays in a direction forwardly of said chamber, said element forming also a plurality of sound outlet channels communicating with said ports and positioned to direct the sound produced by the siren forwardly in the direction of the light rays.

3. In signalling means, a siren comprising a cylindrical stator open at an end thereof and formed circumferentially with spaced ports, a housing element providing a guard having portions embracing the stator and forming a chamber extending forwardly of said siren in communication with the said end of said stator, means to support a light source on said housing element in position to transmit light rays in a direction forwardly of said chamber, said element forming also a pair of sound outlet channels on the opposite sides of said chamber communicating with said spaced ports and positioned to direct the sound produced by the siren forwardly in the direction of the light rays, said chamber being formed with an air inlet opening in a wall thereof extending between said channels.

4. In signalling means, a siren comprising a cylindrical stator formed circumferentially with spaced ports, a housing element providing a guard having an annular portion embracing said stator and forming a chamber extending forwardly of said stator, and means to support a light source in said chamber in a position to transmit light rays in a direction forwardly thereof, said element forming also an annular duct communicating with said spaced ports and a plurality of sound outlet channels communicating each at one end with said annular duct and positioned to direct the sound produced by the siren forwardly in the direction of the light rays.

ROBERT DUNCAN.